United States Patent
Luo et al.

(10) Patent No.: US 11,994,938 B2
(45) Date of Patent: May 28, 2024

(54) SYSTEMS AND METHODS FOR DETECTING INTRA-CHIP COMMUNICATION ERRORS IN A RECONFIGURABLE HARDWARE SYSTEM

(71) Applicant: Samsung Electronics Co., Ltd., Suwon-si (KR)

(72) Inventors: Yukui Luo, Chicago, IL (US); Andrew Chang, Los Altos, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 42 days.

(21) Appl. No.: 17/716,988

(22) Filed: Apr. 8, 2022

(65) Prior Publication Data

US 2023/0144843 A1 May 11, 2023

Related U.S. Application Data

(60) Provisional application No. 63/278,396, filed on Nov. 11, 2021.

(51) Int. Cl.
*G06F 11/07* (2006.01)

(52) U.S. Cl.
CPC ........ *G06F 11/079* (2013.01); *G06F 11/0745* (2013.01)

(58) Field of Classification Search
CPC .............. G06F 11/079; G06F 11/0745
See application file for complete search history.

(56) References Cited

U.S. PATENT DOCUMENTS

| | | | |
|---|---|---|---|
| 3,508,194 A | 4/1970 | Brown | |
| 4,916,701 A | 4/1990 | Eggenberger et al. | |
| 5,182,770 A | 1/1993 | Medveczky et al. | |
| 5,734,663 A | 3/1998 | Eggenberger | |

(Continued)

FOREIGN PATENT DOCUMENTS

| | | |
|---|---|---|
| CN | 103001827 B | 9/2015 |
| CN | 110838935 A | 2/2020 |

(Continued)

OTHER PUBLICATIONS

Ahn, Na-Young, et al., "Countermeasure against Side-Channel Attack in Shared Memory of TrustZone," Original Manuscript, PLOS One, 2017, 20 pages.

(Continued)

*Primary Examiner* — Jigar P Patel
(74) *Attorney, Agent, or Firm* — Lewis Roca Rothgerber Christie LLP

(57) ABSTRACT

Systems and methods for error detection for an address channel are disclosed. The method includes generating a token, applying the token to a request at a source, and generating a first result. The request with the first result is transmitted to a destination over the address channel. A determination is made, at the destination, whether an error associated with the request has occurred. The determining whether the error has occurred includes: receiving a received request corresponding to the request over the address channel; receiving the first result with the received request; applying the token to the received request and generating a second result; comparing the first result with the second result; and transmitting a signal in response to the comparing.

20 Claims, 7 Drawing Sheets

(56) References Cited

U.S. PATENT DOCUMENTS

| | | | |
|---|---|---|---|
| 6,607,136 | B1 | 8/2003 | Atsmon et al. |
| 6,850,769 | B2 | 2/2005 | Grob et al. |
| 7,181,572 | B2 | 2/2007 | Walmsley |
| 7,444,454 | B2 | 10/2008 | Yancey et al. |
| 7,602,274 | B2 | 10/2009 | Lee et al. |
| 7,706,838 | B2 | 4/2010 | Atsmon et al. |
| 8,359,447 | B1 | 1/2013 | Trimberger |
| 8,917,649 | B2 | 12/2014 | Sfar et al. |
| 8,972,744 | B1 | 3/2015 | Trimberger |
| 10,275,306 | B1 | 4/2019 | MacLaren et al. |
| 10,447,470 | B2 | 10/2019 | Viswanathan et al. |
| 10,554,401 | B1 | 2/2020 | Lee |
| 10,819,680 | B1 | 10/2020 | Santan et al. |
| 2003/0046589 | A1* | 3/2003 | Gregg ............... H04L 63/10 726/5 |
| 2012/0030531 | A1* | 2/2012 | Brewerton ........... G11C 29/024 714/719 |
| 2013/0145482 | A1* | 6/2013 | Ricci ............... G07C 5/02 726/28 |
| 2013/0185319 | A1* | 7/2013 | Reilly ............... H03M 7/4031 707/758 |
| 2016/0380770 | A1 | 12/2016 | Whitmer |
| 2017/0185761 | A1 | 6/2017 | Stanwood et al. |
| 2019/0260504 | A1 | 8/2019 | Philip et al. |
| 2020/0380121 | A1 | 12/2020 | Pasricha et al. |
| 2021/0144236 | A1 | 5/2021 | Hochwarth et al. |
| 2021/0149837 | A1 | 5/2021 | Mishra et al. |
| 2021/0151120 | A1 | 5/2021 | Law et al. |
| 2022/0150234 | A1* | 5/2022 | Clancy ............... H04W 12/086 |

FOREIGN PATENT DOCUMENTS

| | | |
|---|---|---|
| CN | 107682126 B | 10/2020 |
| CN | 112350897 A | 2/2021 |
| JP | 2016-52074 A | 4/2016 |
| WO | 2020/055616 A1 | 3/2020 |

OTHER PUBLICATIONS

McCluskey, E.J., "Design Techniques for Testable Embedded Error Checkers," IEEE Computer Society, IEEE, 1990, 5 pages.

Kelsey, John, et al., "Authenticating Secure Tokens Using Slow Memory Access," USENIX, The Advanced Computing Systems Association, 1999, 6 pages.

EPO Extended European Search Report dated Apr. 4, 2023, issued in corresponding European Patent Application No. 22205777.0 (15 pages).

Introduction to AMBA AXI4, 102202 Issue 01, 2020 Arm Limited, 60 pages.

AMBA AXI and ACE Protocol Specification, 2003, 2004, 2010, 2011, 2013 ARM IHI 0022E, ID033013, 328 pages.

Alexander, Mark, "Power Distribution System (PDS) Design: Using Bypass/Decoupling Capacitors," Application Note: Virtex-II Series, XAPP623 (v2.1) Feb. 28, 2005, 27 pages.

Dang, Khanh N. et al., "Parity-based ECC and Mechanism for Detecting and Correcting Soft Errors in On-Chip Communication," 8 pages.

Geran, Amir Ali Kouzeh et al., "A CRC-Based Concurrent Fault Detection Architecture for Galois/Counter Mode (GCM)," 2016 IEEE 23nd Symposium on Computer Arithmetic, pp. 24-31.

Khawaja, Ahmed et al., "Sharing, Protection and Compatibility for Reconfigurable Fabric with AMORPHOS". In $13^{th}$ USENIX OSDI' 18, 22 pages (2018).

Mahmoud, Dina et al., "Timing Violation Induced Faults in Multi-Tenant FPGAs" 2019 Design, Automation & Test in Europe Conference & Exhibition, IEEE, 6 pages.

Pappala, Swetha et al., "FPGA Based Key Generation Technique for Anti-Counterfeiting Methods using Physically Unclonable Functions and Artificial Intelligence," 2012 IEEE, pp. 388-393.

Sivathanu, Gopalan et al., "Ensuring Data Integrity in Storage: Techniques and Applications," StorageSS' 05, Nov. 11, 2005, 11 pages.

Subhasri, G. et al., "VLSI design of Parity check Code with Hamming Code for Error Detection and Correction," Proceedings of the International Conference on Intelligent Computing and Control Systems, 2019 IEEE, pp. 15-20.

Zhao, Mark et al., "FPGA-Based Remote Power Side-Channel Attacks," 2018 IEEE Symposium on Security and Privacy, 16 pages.

Zha, Yue, et al., "Virtualizing FPGAs in the Cloud." Proceedings of the $25^{th}$ ASPLOS' 20, pp. 845-858.

Power Distribution Network, https://www.intel.com/content/www/us/en/support/programmable/support-resources/signal-power-integrity/power-distribution-network.html, 4 pages.

\* cited by examiner

SYSTEMS AND METHODS FOR DETECTING INTRA-CHIP COMMUNICATION ERRORS IN A RECONFIGURABLE HARDWARE SYSTEM

CROSS-REFERENCE TO RELATED APPLICATION(S)

The present application claims priority to and the benefit of U.S. Provisional Application No. 63/278,396, filed Nov. 11, 2021, entitled "SECURITY AND RELIABILITY EXTENSION FOR INTRA-CHIP COMMUNICATION PROTOCOL DEPLOYED ON MULTI-TASK/TENANT RECONFIGURABLE HARDWARE SYSTEM," the entire content of which is incorporated herein by reference.

FIELD

One or more aspects of embodiments according to the present disclosure relate to error detection, and more particularly to detecting intra-chip communication errors in a multi-task/multi-tenant reconfigurable hardware system.

BACKGROUND

Multi-task/multi-tenant (collectively referenced as multi-tenant) field programmable gate arrays (FPGAs) can support multiple applications from the same user, or multiple users may deploy their applications to co-reside in one FPGA chip. A multi-tenant FPGA is a promising architecture for deploying in a data center and/or to the cloud, to drive hardware acceleration.

The above information disclosed in this Background section is only for enhancement of understanding of the background of the present disclosure, and therefore, it may contain information that does not form prior art.

SUMMARY

An embodiment of the present disclosure is directed to a method for error detection for an address channel. The method includes generating a token, applying the token to a request at a source, and generating a first result. The request with the first result is transmitted to a destination over the address channel. A determination is made, at the destination, whether an error associated with the request has occurred. The determining whether the error has occurred includes: receiving a received request corresponding to the request over the address channel; receiving the first result with the received request; applying the token to the received request and generating a second result; comparing the first result with the second result; and transmitting a signal in response to the comparing.

According to one embodiment, the token is a preset token stored at the source and at the destination.

According to one embodiment, the request is one of a request to read or write data, wherein the request includes an address for reading or writing the data, the method further comprising: transferring data over a data channel in response to the request, wherein the data channel is different from the address channel.

According to one embodiment, the applying the token to the request includes performing an XOR operation between the token and the request, and the applying the token to the received request includes performing an XOR operation between the token and the received request.

According to one embodiment, the received request is same as the request, and the signal is indicative of no error associated with the request, wherein in response to the signal, the source transmits a second request over the address channel.

According to one embodiment, wherein the received request is different from the request, and the signal is indicative of error associated with the request, wherein in response to the signal the source re-transmits the request over the address channel.

According to one embodiment, the source and the destination are interfaces of logic blocks of a multi-tenant reconfigurable hardware system.

According to one embodiment, the multi-tenant reconfigurable hardware system is a multi-tenant field programmable gate array.

An embodiment of the present disclosure is also directed to a method for error detection for a data channel comprising: generating a first check bit and a second check bit; transmitting first data with the first check bit and second data with the second check bit, to a destination, over the data channel; determining, at the destination, whether an error associated with the first data and the second data has occurred, wherein the determining whether the error has occurred includes: performing a check based on the first check bit and the second check bit; and transmitting a signal in response to the check.

According to one embodiment, the first check bit is complementary to the second check bit.

According to one embodiment, the performing the check includes performing an XOR operation between the first check bit and the second check bit and producing a value of 1, wherein the signal is indicative of no error associated with the first data and the second data.

According to one embodiment, in response to the signal, the source transmits third data over the data channel.

According to one embodiment, the performing the check includes performing an XOR operation between the first check bit and the second check bit and producing a value of 0, wherein the signal is indicative of error associated with the first data and the second data.

According to one embodiment, in response to the signal, the source re-transmits the first data and the second data.

According to one embodiment, the first data and the second data are transmitted in burst mode in a single transaction.

According to one embodiment, the method further comprises: receiving by the destination over an address channel, a request associated with the first data and the second data, wherein the address channel is different from the data channel.

According to one embodiment, the source and the destination are interfaces of logic blocks of a multi-tenant field programmable gate array.

According to one embodiment, the method further comprises: transmitting the first data and the second data over a first wire; adding propagation delay to a second wire different from the first wire; and transmitting the first check bit and the second check bit over the second wire.

An embodiment of the present disclosure is further directed to a reconfigurable hardware system comprising: a processing chip including a plurality of logic blocks for executing a first application and a second application; and a communications link for providing communication between the plurality of logic blocks. The processing chip is configured to: generate a token; apply the token to a request at a source, and generate a first result; transmit the request with the first result to a destination over an address channel of the communications link; determine, at the destination, whether an error associated with the request has occurred, wherein in determining whether the error has occurred, the processing chip is further configured to: receive a received request corresponding to the request over the address channel; receive the first result with the received request; apply the token to the received request and generate a second result; compare the first result with the second result; and transmit a signal in response to the compare.

An embodiment of the present disclosure is further directed to a reconfigurable hardware system comprising: a processing chip including a plurality of logic blocks for executing a first application and a second application; and a communications link for providing communication between the plurality of logic blocks. The processing chip is configured to: generate a first check bit and a second check bit; transmit first data with the first check bit and second data with the second check bit, to a destination, over a data channel of the communications link; determine, at the destination, whether an error associated with the first data and the second data has occurred, wherein in determining whether the error has occurred, the processing chip is further configured to: perform a check based on the first check bit and the second check bit; and transmit a signal in response to the check.

These and other features, aspects and advantages of the embodiments of the present disclosure will be more fully understood when considered with respect to the following detailed description, appended claims, and accompanying drawings. Of course, the actual scope of the invention is defined by the appended claims.

BRIEF DESCRIPTION OF THE DRAWINGS

Non-limiting and non-exhaustive embodiments of the present embodiments are described with reference to the following figures, wherein like reference numerals refer to like parts throughout the various views unless otherwise specified.

DETAILED DESCRIPTION

Figure 1:
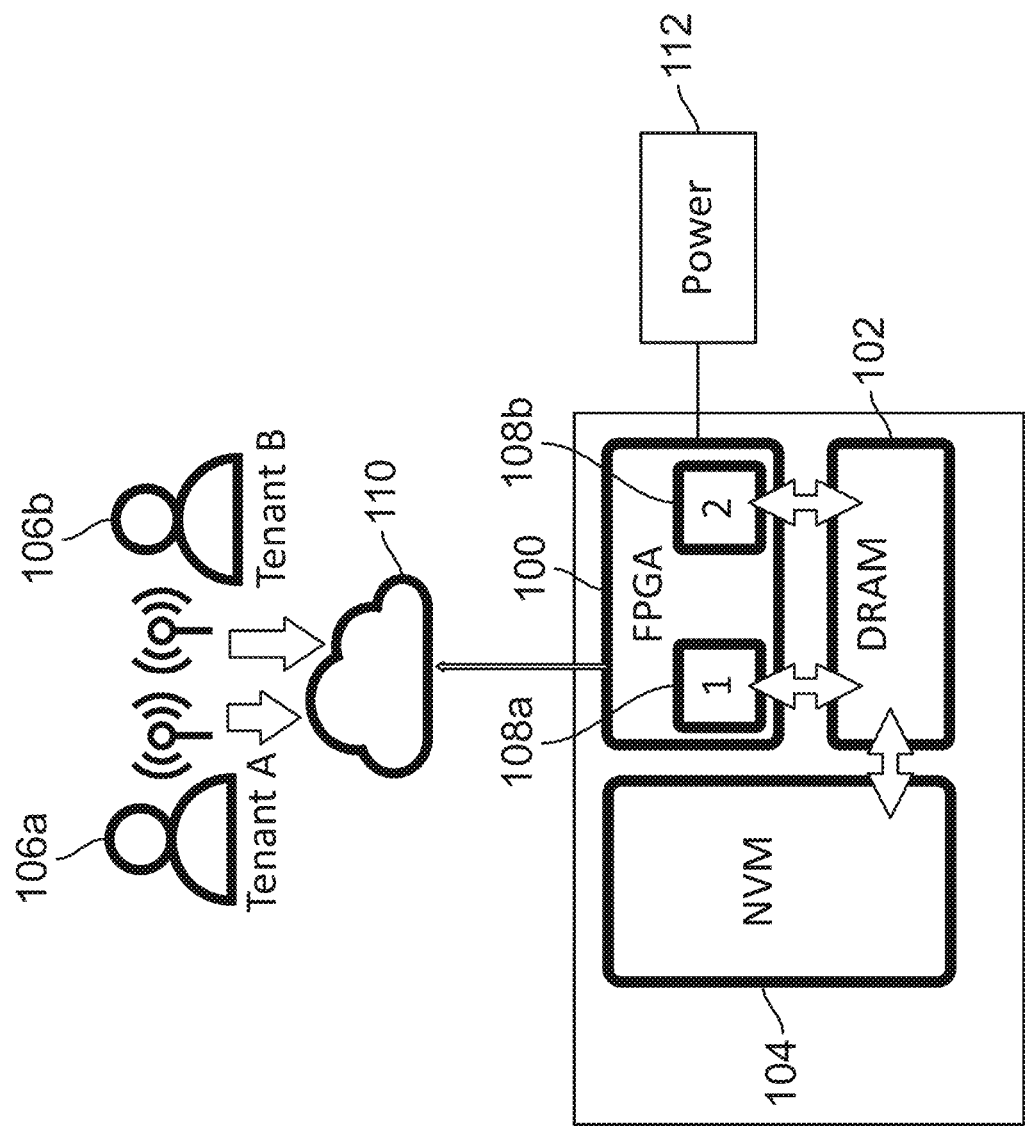
FIG. 1 is a block diagram of a multi-tenant reconfigurable hardware system according to one embodiment.

Hereinafter, example embodiments will be described in more detail with reference to the accompanying drawings, in which like reference numbers refer to like elements throughout. The present disclosure, however, may be embodied in various forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated. Further, in the drawings, the relative sizes of elements, layers, and regions may be exaggerated and/or simplified for clarity.

Field Programmable Arrays (FPGAs) can be used to speed up computation and data management tasks in various application domains. As the demand for hardware acceleration increases, a multi-tenant FPGA may be considered. A multi-tenant FPGA may be useful, for example, in a cloud setting to co-locate different tenant's workloads and increase utilization of the FPGA.

In general terms, an FGPA chip includes various logic blocks/modules that communicate with one another using an intra-chip communication protocol. One such protocol is an Advanced Microcontroller Bus Architecture (AMBA) Advanced eXtensible Interface (AXI) protocol. The popularity of the AMBA AXI protocol may be due to its ability to provide high-frequency, high-bandwidth, and high-speed data communication amongst the modules. However, a drawback to an intra-chip communication protocol such as AMBA AXI, is that it is generally aimed for use for single tenant FPGAs. In addition, the protocol supports intra-chip connection of the FPGA modules that is approximately in the submicrometer in range. Thus, there may not be a need to ensure communication security and reliability, as any erroneous transmissions may be addressed by re-transmitting the data.

Security and reliability measures, however, may be desirable for multi-tenant reconfigurable hardware systems such as FPGAs. In a multi-tenant FPGA, multiple tasks or tenants may co-reside on one FPGA chip. The different tenants may have the flexibility to program and run their own applications, while sharing certain hardware resources.

A power distribution network/system (PDN/S) may typically function as a single, shared power source that drives the FPGA. One issue with a shared power source is that power side-channels, such as, for example, intra-chip power competition between different circuits/applications on the FPGA, may cause voltage fluctuations. In a multi-tenant setting, aggressive FPGA utilization by one tenant's application may lead to a supply voltage drop. The supply voltage drop may be maliciously caused by the co-tenant to inject fault into the device (e.g. a fault injection attack) to access, for example, privileged information. It may be desirable to extend the intra-chip communication protocol to provide for error detection to detect, for example, fault injection attacks.

FIG. 1 is a block diagram of a multi-tenant reconfigurable hardware system according to one embodiment. The system includes a reconfigurable processing device 100 such as, for example, an FPGA. Hereinafter, the reconfigurable processing device will simply be referred to as an FPGA 100. However, embodiments of the present disclosure are not limited thereto, and may extend to other processing devices which logic may be reconfigured and reused, for example, at runtime, to support any workload that a user may desire.

The FPGA 100 may be coupled to an external, off-chip memory such as a dynamic random access memory (DRAM) 102 and a non-volatile memory (NVM)/storage device 104. The storage device 104 may be, for example, a solid state drive (SSD). The FPGA 100 may also be coupled to a power supply system 112. The power supply system 112 may be configured to provide power to the entire FPGA.

In one embodiment, the FPGA 100 may be deployed in a data center and/or in the cloud. The FPGA 100 may service multiple users/tenants 106a, 106b (collectively 106), allowing the multiple users/tenants 106 to deploy their software applications 108a, 108b (collectively referenced as 108) to co-reside on the same FPGA. The applications 108 may be, for example, data processing applications, graph processing applications, machine learning applications, and/or the like. The tenants 106 may access the FPGA 100 over a data communications network (e.g. Internet) 110 as a stand-alone node, or coupled with a host machine.

Due to the co-tenancy for the FPGA, the application 108 of a particular tenant 106 may be vulnerable to attacks (e.g. by another tenant). An attacker may gain unauthorized access to the particular tenant's application 108 by launching, for example, fault injection attacks. The fault injection attack by the attacker may take advantage of the shared power system 112. For example, a co-tenant (e.g. tenant 106a) of the FPGA 100 may cause a voltage drop of the power supplied to the FPGA by the power system 112, by aggressive FPGA utilization. The voltage drop may leave the other co-tenants (e.g. tenant 106b) vulnerable to attacks by the tenant that caused the voltage drop.

Figure 2:
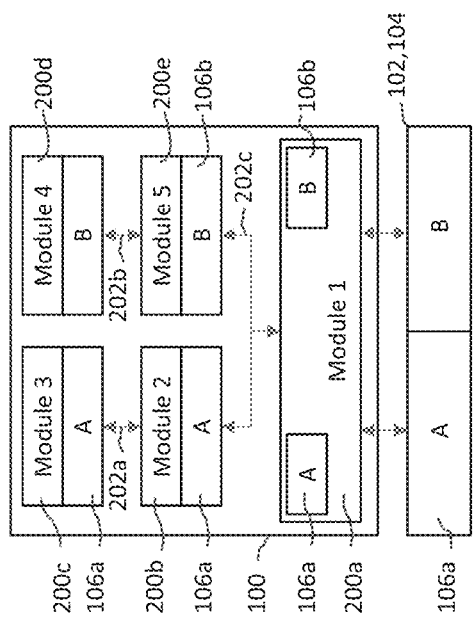
FIG. 2 is a conceptual block diagram of a field programmable gate array (FPGA) according to one embodiment.

FIG. 2 is a more detailed conceptual block diagram of the FPGA 100 according to one embodiment. The FPGA includes one or more logic blocks/modules 200a-200e (collectively referenced as 200) that include circuitry for running the applications 108 of the tenants 106. The one or more blocks 200 are also referred to as intellectual property (IP) cores/blocks, and may be reusable pieces of logic that form the building blocks of the FPGA. The logic blocks may communicate with each other over data communication links 202a-202c (collectively referenced as 202). The communication over links 202a-202c may adhere to an intra-chip communication protocol such as AMBA AXI. Although AMBA AXI is used as an example, the embodiments of the present disclosure are not limited thereto, and may extend to other intra-chip communication protocols that will be appreciated by a person of skill in the art.

In one embodiment, the logic blocks may be accessed by the tenants 106 to run their corresponding applications 108. In one example, tenant A 106a runs application 108a (FIG. 1), and tenant B 106b runs application 108b (FIG. 1). Module 1 200a may be a time-division multiplexing module configured to schedule time for both tenant A 106a and tenant B 106b to process their data for applications 108a and 108b separately and independently. Module 2 200b and module 3 200c may keep data from tenant A 106a and run application 108a. Module 4 200d and module 5 200e may keep data from tenant B 106b and run application 108b. An attack against a tenant may be launched, for example, via link 202a and/or via link 202b.

In one embodiment, the off-chip memory (e.g. DRAM 102 and NVM 104) is partitioned between the tenants 106 for storing data for the tenants. One or more of the logic blocks 200 may access data from the off-chip memory in running the applications 108.

Figure 3:
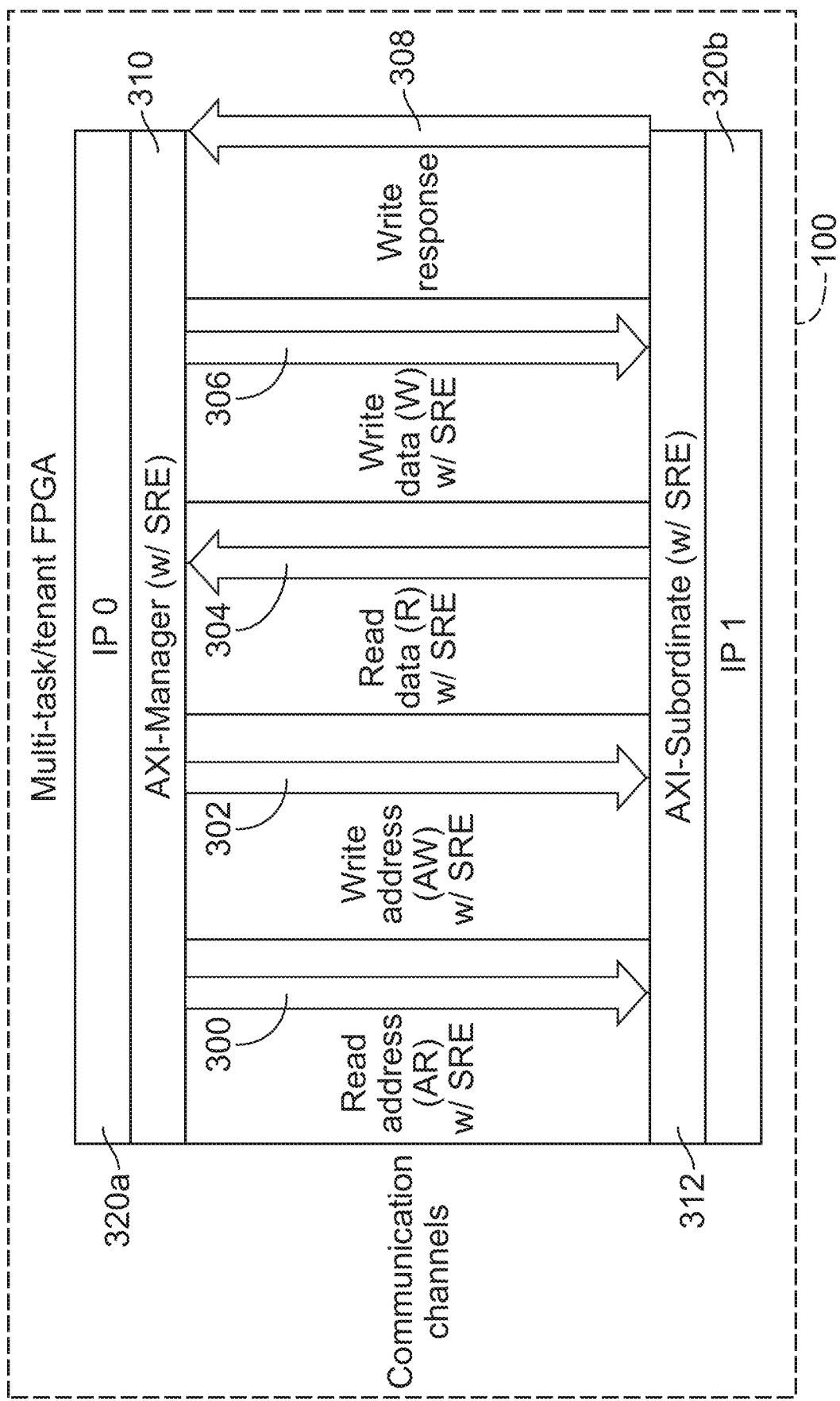
FIG. 3 is a block diagram of exemplary communication channels used for intra-chip communication between logic blocks of the FPGA of FIG. 2, according to one embodiment.

FIG. 3 is a block diagram of exemplary communication channels used for intra-chip communication between the logic blocks 200 according to one embodiment. The communication via the communication channels may follow the protocol set forth by the AMBA AXI protocol.

In one embodiment, five separate communication channels are used for the intra-chip communication: read address 300; write address 302; read data 304; write data 306; and write response 308. The communication channels may be similar to the communication channels disclosed by Arm Limited, "Introduction to AMBA AXI4," Issue 01, 2020, the content of which is incorporated herein by reference. Using separate address and data channels for read and write transfers may help maximize the bandwidth of the interface. For example, a read sequence may occur at the same time as a write sequence.

In one embodiment, the channels 300-308 are established between a manager 310 and a subordinate 312. The manager 310 and subordinate 312 may be communication interfaces used for communication between the logic blocks 200 (e.g. IP block 0 320a and IP block 1 320b). In order to communicate using one of the channels, a handshake process may first take place using "ready" and "valid" signals. For example, in engaging in a handshake in the read address channel 300, the channel source (e.g. manager 310) may provide a valid signal via the channel, and the channel receiver (e.g. subordinate 312) may provide a ready signal via the same channel. Transmission of a request with the address to be read may occur on the address channel 300 after both the valid and ready signals are active. It should be understood that role of the manager and the subordinate 310, 312 as source or receiver may vary depending on the flow of data that is transmitted. For example, for the read address channel 300, write address channel 302, and write data channel 306, the manager 310 is the source while the subordinate is the receiver 312, while for the read data channel 304, the subordinate 312 is the source while the manager 310 is the receiver.

A current art intra-communication protocol may not engage in error checking during the handshaking process. Although this may be acceptable for a single tenant FPGA, error detection may be desirable for a multi-tenant FPGA. Accordingly, in one embodiment, the handshaking process in the read address channel 300, write address channel 302, read data channel 304, and write data channel 306, is enhanced with an error detection mechanism.

Figure 4A:
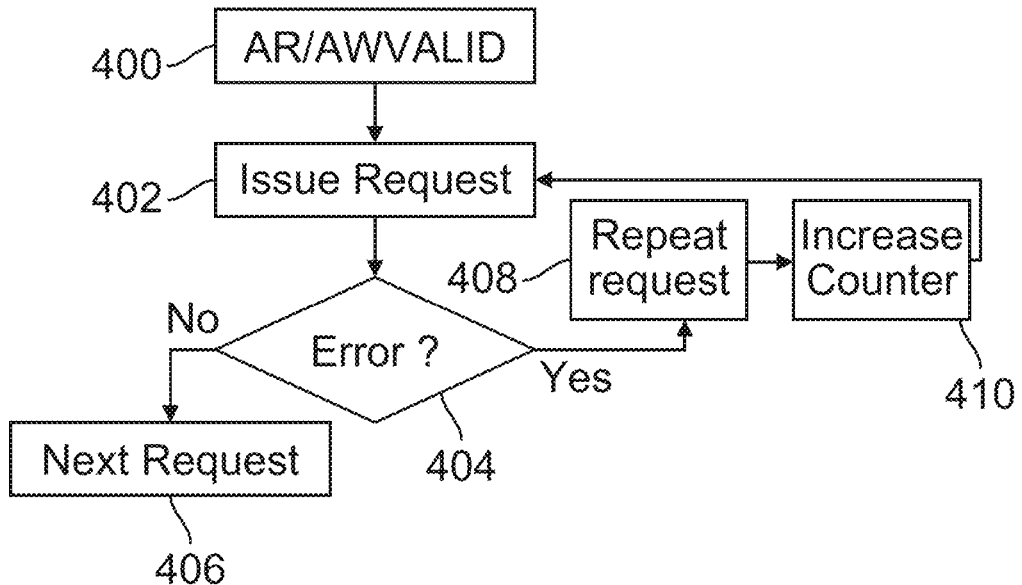
FIGS. 4A-4B are flow diagrams of a handshaking process that includes error checking for read and write address channels according to one embodiment.
Figure 4B:
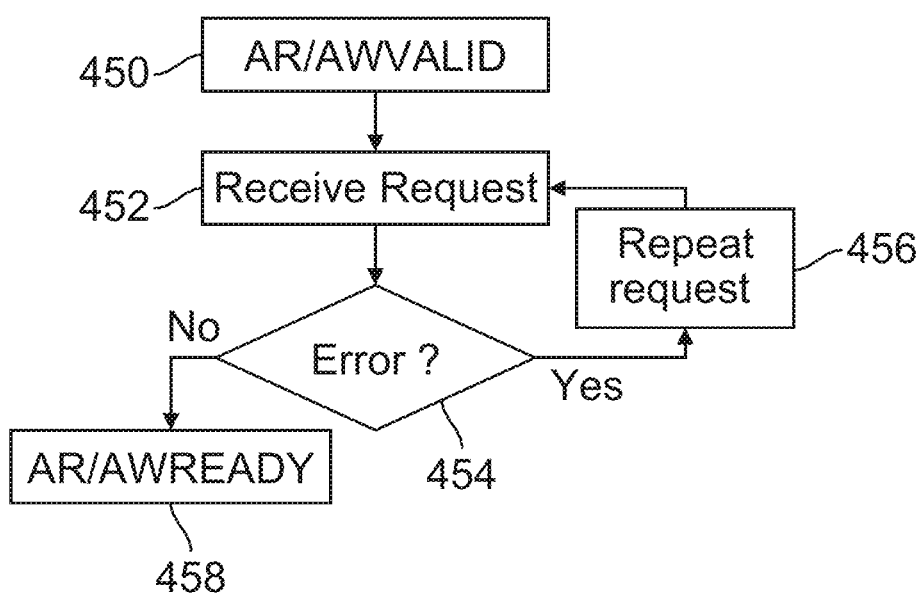

FIGS. 4A-4B are flow diagrams of the enhanced handshaking process with error detection for the read and write address channels 300, 302 according to one embodiment. FIG. 4A is the handshaking process for the manager 310, taking the role of the source of the request.

At block 400, the manager 310, asserts a read address valid signal (ARVALID) or a write address valid signal (AWVALID) for indicating that a valid request is available. The request may include, for example, the address of the requested data, source identifier, burst length, and/or size. In one embodiment, the request is generated by a data buffer or finite state machine.

At block 402 the manager 310 (source) transmits the request to the subordinate 312 (receiver) on the read address channel 300 or write address channel 302, depending on whether data is to be read or written.

At block 404, the manger 310 determines whether an error associated with the request has occurred. In this regard, the manager 310 may check for a response signal from the subordinate 312. If the response signal is a signal indicating no error (e.g. ARREADY or AWREADY signal), the source transmits a next request at block 406.

If, however, the response signal from the receiver is a signal indicating an error, the source transmits a command, at block 408 to re-transmit the request, and increases, at block 410, a global error counter. In one embodiment, the global counter keeps a running number of errors encountered by the FPGA during an intra-chip communication using the communication channels 300-306. The global counter may help identify attacks (e.g. fault injection attacks), even if the frequency of the attacks is low. For example, in a well-designed attack, the adversary may launch attacks at lower frequencies designed to avoid FPGA overload protection (e.g. shut down), but not stop, the intra-channel data transmissions. When a threshold number of errors due to such attacks is detected, a notification may be transmitted to an administrator, and/or the FPGA 100 may be disabled.

FIG. 4B is the handshaking process for the subordinate 312 (receiver), according to one embodiment. In response to detecting that the ARVALID or AWVALID signals have been asserted at block 450, the subordinate 312 receives, at block 452, the request from the manager 310 (source) on the read address channel 300 or write address channel 302, depending on whether data is to be read or written.

At block 454, the subordinate 312 determines whether an error associated with the request has occurred. In this regard, the subordinate 312 may apply an error detection mechanism that uses shared keys/tokens to check the integrity of the received request. If an error is detected, a response signal is transmitted, at block 456, indicating an error and/or requesting repeat of the request. The subordinate 312 may then wait for the request to be retransmitted. In one embodiment, the global counter is increased by the subordinate 312, instead of the manager 310, in response to detecting the error. In such an embodiment, block 410 is executed by the subordinate 312 instead of the manager 310.

If a determination is made, at block 454, that no errors have occurred in the received request, the subordinate transmits, at block 458, a signal indicating no error (e.g. ARREADY or AWREADY signal).

Figure 5:
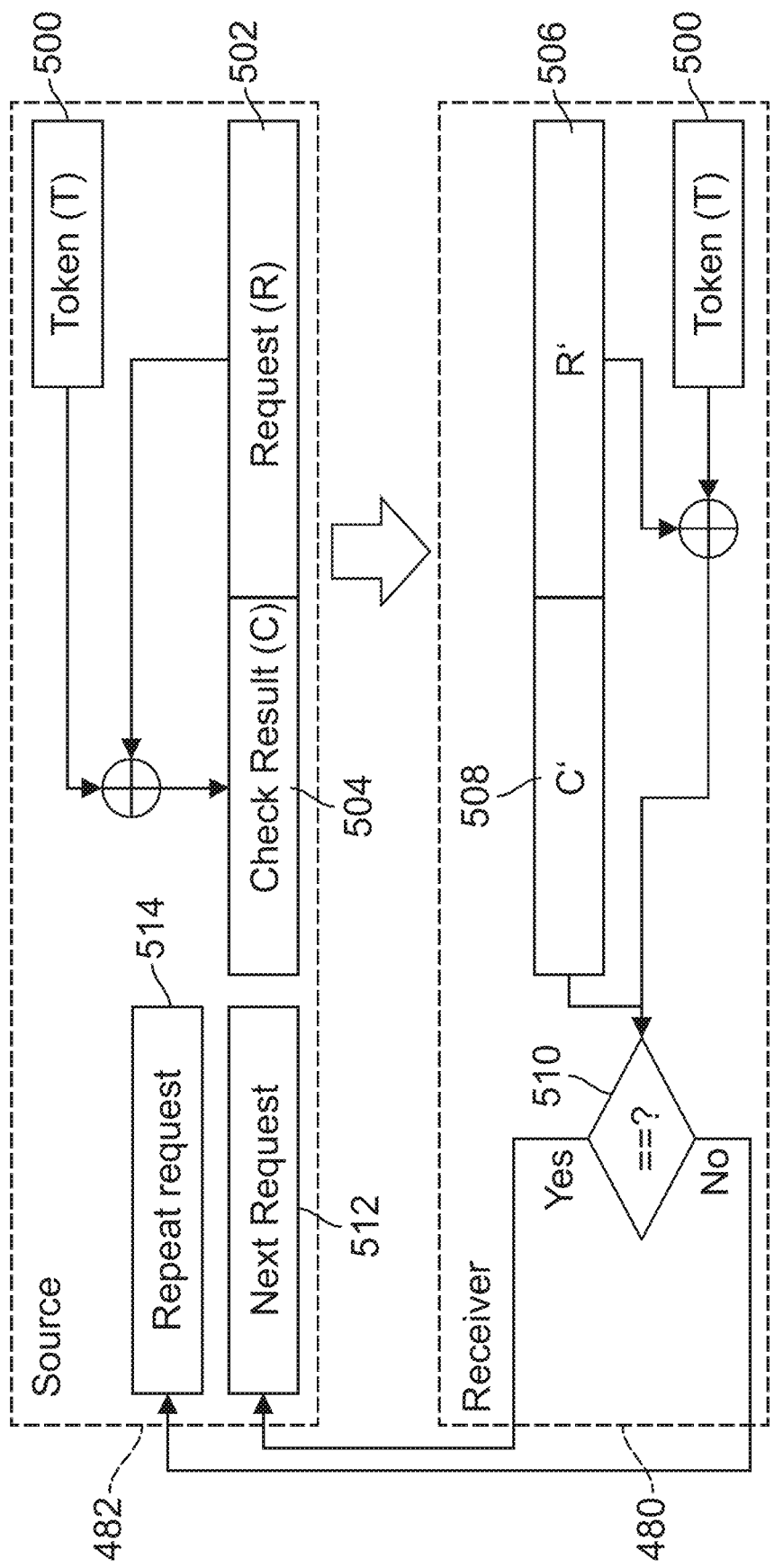
FIG. 5 is a flow diagram of an error detection method engaged by a receiver for detecting error of requests received over read and write address channels according to one embodiment.

FIG. 5 is a flow diagram of the error detection method engaged by a receiver 480 (e.g. subordinate 312) for detecting errors of requests transmitted by a source 482 (e.g. manager 310) over the read and write address channels 300, 302 according to one embodiment. In one embodiment, a shared token 500 is generated and prestored in the various logic blocks 200. For example, the token may be stored during configuration of the FPGA 100. In one embodiment, a different token may be generated depending on the type of bitstream, and the appropriate token selected for error detection based on the type of the bitstream involved in a current transaction. For example, a read request may invoke a different token from a write request. The size of the token may be the same as the request, or a fraction of the size of the request.

The source 482 may apply the token (T) 500 to a generated request (R) 502 to generate a source check result (C) 504. In one embodiment, the manager 310 performs an XOR operation between the token 500 and the request 502 to compute the source check result 504 as follows: $K \oplus R = C$. The source check result 504 may be packaged with the request 502, and transmitted to the subordinate 312 (e.g the receiver 480) over the read or write address channels 300, 302.

The receiver 480 receives a received request (R') 506 and a received check value (C') 508. The subordinate 312 performs an XOR operation between the shared token 500 and the received request (R') 506, to compute a subordinate check result (C"). The received check value (C') 508 is compared against the subordinate check result C" to determine whether they are equal. If the answer is YES, as determined in block 510, the received request (R') 506 is deemed to be equal to the transmitted request (R) 502. Thus, no error is detected in the transmitted request, and the subordinate 312 transmits an ARREADY or AWREADY signal for prompting the source 482 to transmit a next request 512.

If the answer is NO, an error is detected, and the subordinate 312 transmits an error signal for prompting the manager 312 (e.g. the source 482) to re-transmit 514 the request. In this manner, the subordinate 312 waits for an error-free request to be received before transmitting the ARREADY or AWREADY signal that completes the handshaking process on the address channel 300, 302.

Figure 6:
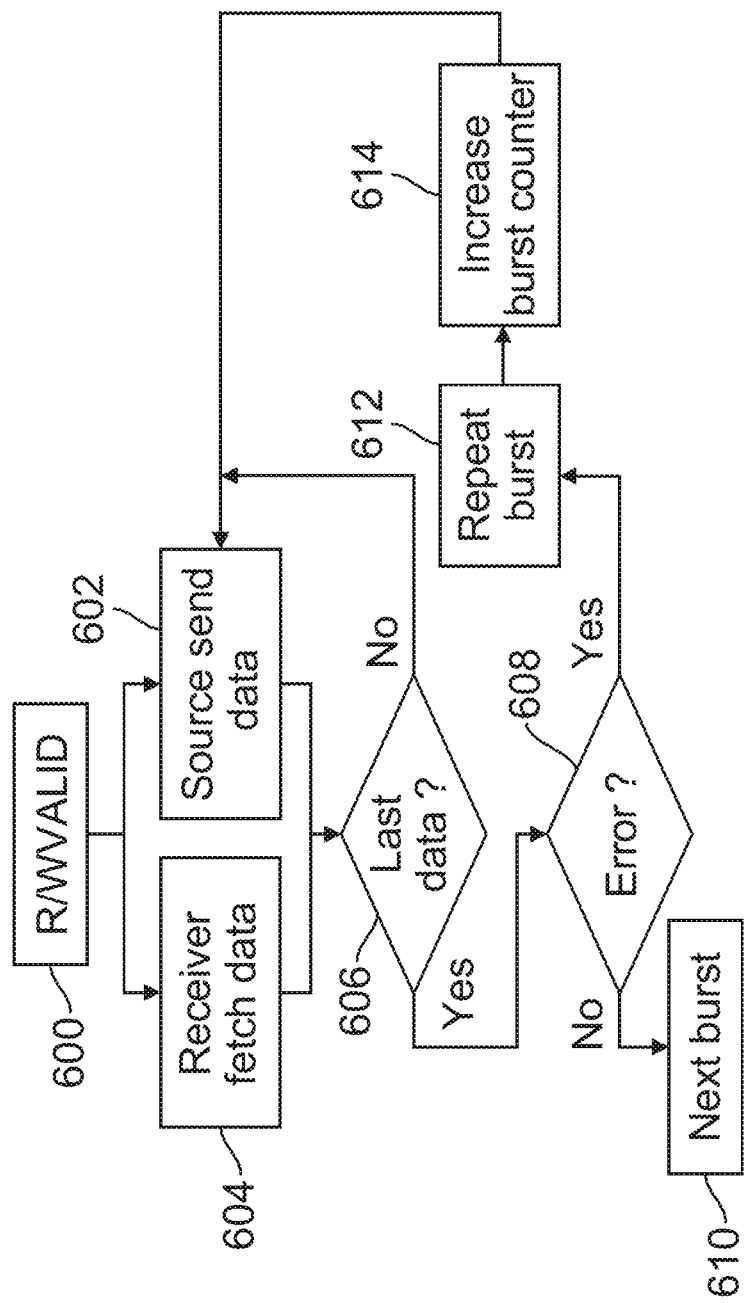
FIG. 6 is a flow diagram of a handshaking process that includes error checking for read and write data channels according to one embodiment.

FIG. 6 is a flow diagram of an enhanced handshaking process that includes error checking for the read and write data channels 304, 306 according to one embodiment. The handshaking on the data channel 304, 306 may be invoked in response to a successful handshaking on the read or write address channel 300, 302.

At block 600, the source asserts a read valid signal (RVALID) or write valid (WVALID) signal for indicating that valid data is available by the source. In one embodiment, the subordinate 312 takes the role of the source for a data transmission in response to a read request, and the manager 310 takes the role of the receiver that receives the read data. For a write request, the manager 310 may be the source of the data to be written, and the subordinate 312 may be the receiver.

In one embodiment, the data that is to be transferred includes a plurality of data items based on upon a single address identified in the read or write request transmitted via the read or write address channels 300, 302. The plurality of data items may be transmitted in a burst mode in a single transaction. The data item transferred in the burst mode may be referred to as a beat.

At block 602, the source transmits a data item (beat) over the read or write data channels 304, 306, and the receiver receives the transmitted data item at block 604.

The transmission and receipt of the data items in a burst occur until a last data item associated with the burst is identified. In this regard, the source determines, at block 606, if the last data is identified. If the answer is NO, a next data item is sent and received.

If the answer is YES, the source determines, at block 608, whether an error is detected for the transmitted data. In this regard, the source may check for a response signal from the receiver. If the response signal is a signal indicating no error (e.g. RREADY or WREADY signal), the source transmits a next burst of data at block 610.

If, however, the response signal from the receiver is a signal indicating an error, the source transmits a command, at block 612, and the data burst is re-transmitted to the destination. In one embodiment, the source also increases, at block 614, a burst repeat counter. In one embodiment, the burst repeat counter keeps a running number of burst repeats for a single data transaction. The burst repeat counter may help identify high-frequency attacks (e.g. fault injection attacks) where the adversary prevents progress in the transmission of the burst of data. When a threshold number of burst repeats are made due to such attacks, a notification may be transmitted to an administrator, and/or the FPGA 100 may be disabled. In one embodiment, a successful data transmission prior to reaching the threshold number resets the burst repeat counter.

Figure 7:
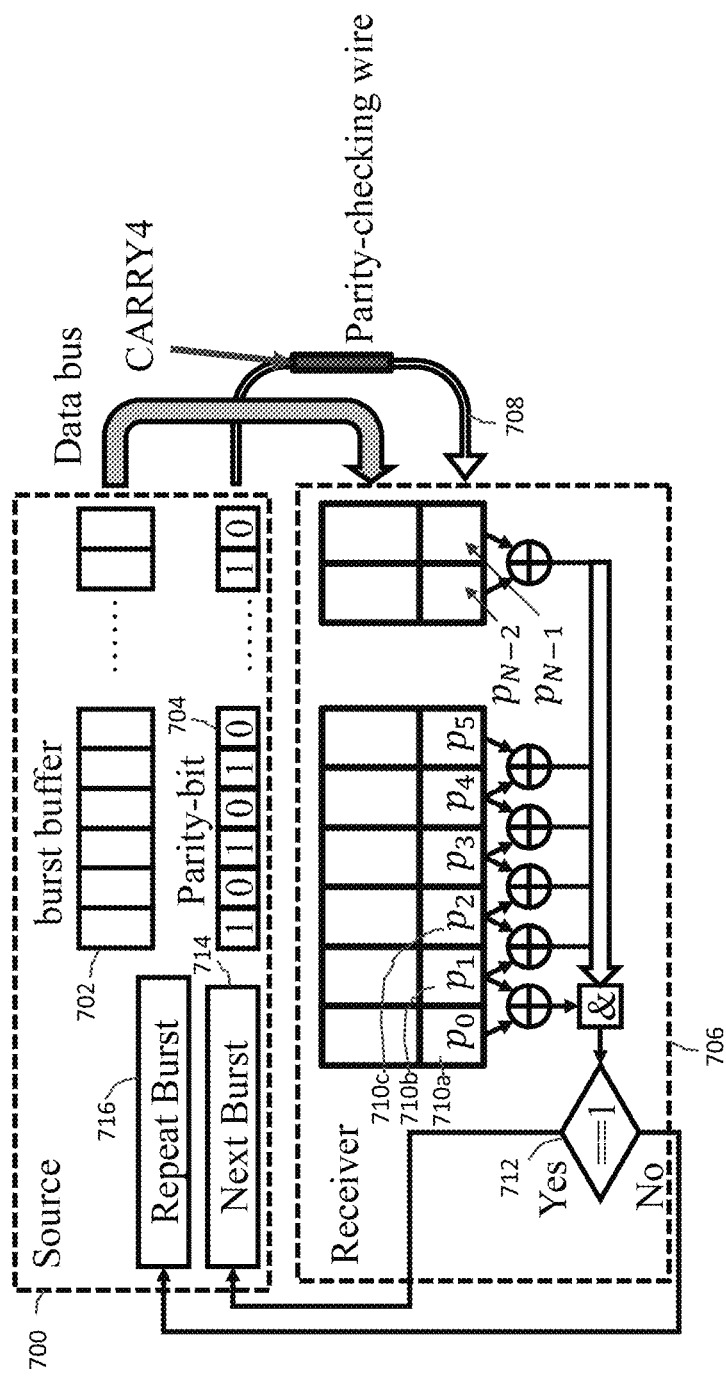
FIG. 7 is a flow diagram of an error detection method by a source for detecting data transmission errors over read and write data channels according to one embodiment.

FIG. 7 is a flow diagram of the error detection method by a source 700 for detecting data transmission errors over the read and write data channels 304, 306 according to one embodiment. In one embodiment, the source 700 stores the data items to be transmitted in a burst buffer 702. The data items may be identified based on the read or write data request transmitted over the read or write address channel 300, 302.

In one embodiment, the source 700 adds a parity bit (also referred to as a check bit) 704 to each beat of data, and sends the padded beats to the receiver 706. In one embodiment, the parity bits are selected so that two consecutive parity bits to be added to two consecutive beats of data, are complementary to one another (e.g. 01 or 10).

The source 700 may transmit the data items in the burst buffer 702 to a receiver 706 over a data channel 304, 306. In one embodiment, the parity bits are transmitted separately over a parity checking wire 708. The receiver 706 may start a parity check function when the last data in the burst has been received.

In one embodiment, the parity check function performs an XOR operation between two consecutive parity bits 710a-710c, and further applies an AND operation to the results of the XOR operation to output a final check result as follows:

$$\text{check result} = (p_0 \oplus p_1) \times (p_2 \oplus p_3) \times \ldots \times (p_{N-2} \oplus p_{N-1}),$$

where N is the burst length and an even number.

If the value of the check result is 1, as determined in block 712, no error is detected, and the receiver 706 transmits an AREADY or WREADY signal for prompting the source 700 to transmit a next burst 714.

If the value of the check result is 0, an error is detected, and the receiver 706 transmits an error signal for prompting the source 700 to re-transmit 716 the data burst. In this manner, the receiver 706 waits for an error-free data transmission of a data burst before sending the RREADY or WREADY signal that completes the handshaking process on the data channel 304, 306.

In one embodiment, the FPGA 100 includes a measure for minimizing the possibility of a false negative check result. A false negative may occur when the data transmitted over the data channel 304, 306 is corrupted, but the parity bits are not, resulting in the check result taking a value of 1 that is indicative of no error. In order to minimize the possibility of false negatives, the load of the parity checking wire 708 is increased, making the parity checking wire 708 more sensitive to attacks (e.g. fault injection attacks) than the data channel 304, 306. In one embodiment, load of the parity checking wire 708 is increased by connecting the parity checking wire to a carry-chain (e.g. CARRY4) that increases the propagation delay of the parity bit transmission.

As a person of skill in the art should recognize, the systems and methods for detecting intra-chip communication errors as described herein provide advantages over current art intra-chip communication protocols, by allowing error detection in the communication, data recalling, and transmitting alarms for perceived fault injection attacks. The error detection has low cost and does not require extra complex hardware design to address the fault.

The terminology used herein is for the purpose of describing particular embodiments only and is not intended to be limiting of the inventive concept. Also, unless explicitly stated, the embodiments described herein are not mutually exclusive. Aspects of the embodiments described herein may be combined in some implementations.

As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Although exemplary embodiments of systems and methods for detecting intra-chip communication errors have been specifically described and illustrated herein, many modifications and variations will be apparent to those skilled in the art. Accordingly, it is to be understood that the systems and methods for detecting intra-chip communication errors constructed according to principles of this disclosure may be embodied other than as specifically described herein. The disclosure is also defined in the following claims, and equivalents thereof.

What is claimed is:

1. A method for error detection comprising:
generating a token;
applying the token to a request at a source, and generating a first result, wherein the applying for the token to the request includes comparing, at the source, the request to the token;
transmitting the request with the first result to a destination over an address channel;
determining, at the destination, whether an error associated with the request has occurred, wherein the determining whether the error has occurred includes:
receiving a received request corresponding to the request over the address channel;
receiving the first result with the received request;
applying the token to the received request and generating a second result, wherein the applying the token to the received request includes comparing, at the destination, the received request to the token;
comparing the first result with the second result; and
transmitting a signal in response to the comparing of the first result with the second result.

2. The method of claim 1, wherein the token is a preset token stored at the source and at the destination.

3. The method of claim 1, wherein the request is one of a request to read or write data, wherein the request includes an address for reading or writing the data, the method further comprising:
  transferring data over a data channel in response to the request, wherein the data channel is different from the address channel.

4. The method of claim 1, wherein the applying the token to the request includes performing an XOR operation between the token and the request, and the applying the token to the received request includes performing an XOR operation between the token and the received request.

5. The method of claim 1, wherein the received request is same as the request, and the signal is indicative of no error associated with the request, wherein in response to the signal, the source transmits a second request over the address channel.

6. The method of claim 1, wherein the received request is different from the request, and the signal is indicative of error associated with the request, wherein in response to the signal the source re-transmits the request over the address channel.

7. The method of claim 1, wherein the source and the destination are interfaces of logic blocks of a multi-tenant reconfigurable hardware system.

8. The method of claim 7, wherein the multi-tenant reconfigurable hardware system is a multi-tenant field programmable gate array.

9. The method of claim 3, wherein based on the signal having a first value, performing error detection for the data channel, and wherein based on the signal having a second value, changing an attribute of a processing device.

10. The method of claim 9, further comprising:
  generating a second signal based on performing the error detection for the data channel, wherein based on the second signal having a third value, changing the attribute of the processing device.

11. A reconfigurable hardware system comprising:
  processing chip including a plurality of logic blocks for executing a first application and a second application;
  a communications link for providing communication between the plurality of logic blocks,
  wherein, the processing chip is configured to:
    generate a token;
    apply the token to a request at a source, and generate a first result, wherein in the processing chip being configured to apply the token to the request, the processing chip is configured to compare, at the source, the request to the token;
    transmit the request with the first result to a destination over an address channel of the communications link;
    determine, at the destination, whether an error associated with the request has occurred, wherein in determining whether the error has occurred, the processing chip is further configured to:
      receive a received request corresponding to the request over the address channel;
      receive the first result with the received request;
      apply the token to the received request and generate a second result, wherein in the processing chip being configured to apply the token to the received request, the processing chip is configured to compare, at the destination, the received request to the token;
    compare the first result with the second result; and
    transmit a signal in response to the compare of the first result with the second result.

12. The system of claim 11, wherein the token is a preset token stored at the source and at the destination.

13. The system of claim 11, wherein the request is one of a request to read or write data, wherein the request includes an address for reading or writing the data, and the processing chip is further configured to:
  transfer data over a data channel in response to the request, wherein the data channel is different from the address channel.

14. The system of claim 11, wherein in applying the token to the request, the processing chip is further configured to perform an XOR operation between the token and the request, and wherein in applying the token to the received request, the processing chip is further configured to perform an XOR operation between the token and the received request.

15. The system of claim 11, wherein the received request is same as the request, and the signal is indicative of no error associated with the request, wherein in response to the signal, the source is configured to transmit a second request over the address channel.

16. The system of claim 11, wherein the received request is different from the request, and the signal is indicative of error associated with the request, wherein in response to the signal the source is configured to re-transmit the request over the address channel.

17. The system of claim 11, wherein the source and the destination are interfaces of logic blocks of a multi-tenant reconfigurable hardware system.

18. The system of claim 17, wherein the multi-tenant reconfigurable hardware system is a multi-tenant field programmable gate array.

19. The system of claim 13, wherein based on the signal having a first value, the processing chip is configured to perform error detection for the data channel, and wherein based on the signal having a second value, the processing chip is configured to change an attribute of a processing device.

20. The system of claim 19, wherein the processing chip is further configured to:
  generate a second signal based on performing the error detection for the data channel, wherein based on the second signal having a third value, changing the attribute of the processing device.

* * * * *